Patented June 5, 1923.

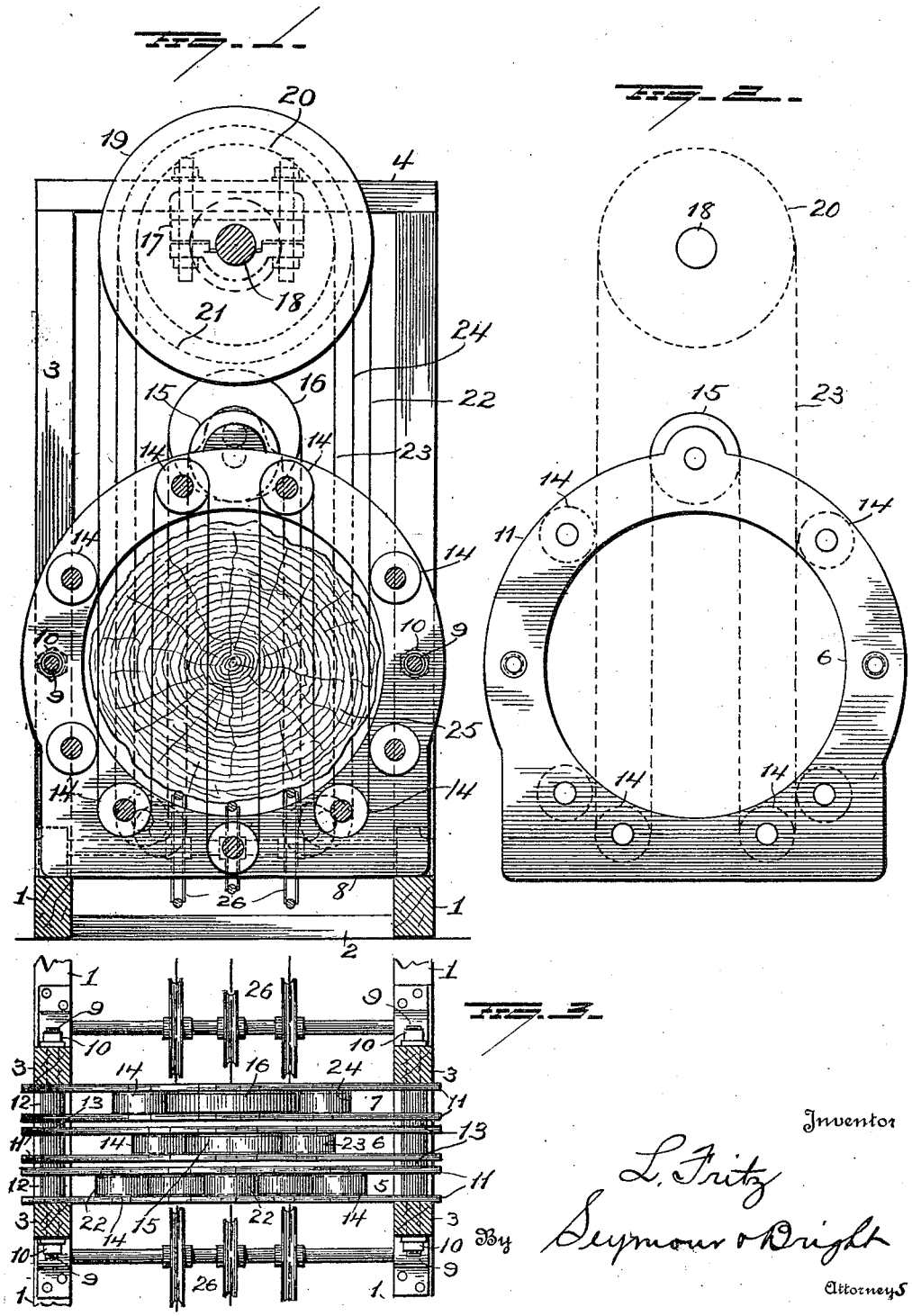

1,457,626

UNITED STATES PATENT OFFICE.

LOUIS FRITZ, OF MEMPHIS, TENNESSEE.

WOODWORKING MACHINERY.

Application filed August 15, 1922. Serial No. 581,965.

*To all whom it may concern:*

Be it known that I, LOUIS FRITZ, a citizen of the United States, and a resident of Memphis, in the county of Shelby and State of Tennessee, have invented certain new and useful Improvements in Woodworking Machinery; and I do hereby declare the following to be a full, clear, and exact description of the invention, such as will enable others skilled in the art to which it appertains to make and use the same.

This invention relates to improvements in wood working machinery and more particularly to saw-mill apparatus,—one object of the invention being to so construct saw-mill apparatus that the same shall operate efficiently and economically to completely saw a log into a number of boards of the desired thickness during a single continuous passage of the log through the apparatus and without the necessity of interrupting the travel of the log and turning it at an intermediate portion of its travel.

With this and other objects in view, the invention consists in certain novel features of construction and combinations of parts as hereinafter set forth and pointed out in the claims.

In the accompanying drawings:

Figure 1 is a view partly in elevation and partly in section showing an embodiment of my invention.

Figure 2 is a view illustrating a unit of the apparatus, and

Figure 3 is a plan view, partly in section.

My improved apparatus contemplates a plurality of saw units which are mounted parallel with and in proximity to each other in a framework, and each unit includes a continuous band saw so mounted as to present a plurality of parallel portions spaced apart to saw the log into a plurality of boards, and the several units are so constructed that boards sawed by the saw of one unit shall be divided by one or more other units into boards of less thickness.

The base of the main framework may comprise parallel timbers 1, 1, suitably spaced apart and braced by cross-bars such as indicated at 2.

The main frame also includes standards 3 projecting upwardly from the respective base timbers and said standards may be braced at their upper ends by cross-bars such as indicated at 4. The uprights 3 on the respective base timbers are suitably spaced apart to receive the frames of the several saw units between them.

Saw frames 5, 6, 7, may, in the embodiment of the invention shown in the drawings, be made approximately circular in form having straight base portions 8 to permit them to be mounted upon the base portion of the framework as illustrated in Figure 1, and the several saw frames are normally held in place by means of rods or bolts 9 passing through said frames and through the standards 3 of the main framework,—said rods or bolts being threaded at their respective ends for the reception of nuts 10. Each saw frame comprises two frame-members 11, 11 spaced apart by sleeves 12 on the rods or bolts 9, and the several saw frames are spaced apart by short sleeves or collars 13 on said rods or bolts.

Pulleys 14 are mounted between the members of each frame 5, 6, 7, and at the upper portions of the respective saw frames 6 and 7, pulleys 15 and 16 are mounted,—said last-mentioned pulleys differing successively in diameter as indicated in Figure 1.

Suitable bearing devices 17 are secured to the top portion of the main frame for the accommodation of driving shaft 18, and this shaft carries three pulleys 19, 20 and 21 which differ in diameters and are positioned to be disposed over the several saw-frames 5, 6 and 7. The pulleys 14, 15, 16, 19, 20 and 21 are arranged to receive, position and control the movements of a plurality of band saws 22, 23, 24, the relative sizes of the pulleys 15 and 16 and the pulleys 19, 20, 21, being such and the pulleys 14 of the several frames 5, 6, 7, being so disposed in the respective saw frames that the saws 22, 23, 24 will be disposed respectively in such relative positions that said saws shall be staggered relatively to each other, so that the log will first be severed into boards of given thickness and these boards subsequently severed to form boards of less thickness.

The band saw 22 passes over the largest upper pulley 19 and back and forth over pulleys 14 of the saw frame 5, so that several parallel portions of the saw will be in position to sever a log 25 into boards of predetermined thickness as said log is moved forwardly by suitable conveying means indicated at 26. The saw 23 passes over the smallest pulley (20) of the pulleys at the top of the main frame, about the lower pulleys 14 in the saw frame 6 (being guided by other of said pulleys 14 in this frame) and over the pulley 15 at the top of said frame 6, so that the parallel active portions of this saw 23 will be staggered with respect to the active portions of the saw 22. The saw 24 passes in a similar manner with respect to pulleys of the saw frame 7, but the pulley 16 on this frame is larger than the pulley 15 on frame 6 and the pulley 21 at the top of the main frame, over which the saw 24 passes is of greater diameter than the pulley 20 and of less diameter than the pulley 19, so that the parallel active portions of the saw 24 will be staggered relatively to the active portions of the saws 22 and 23.

From the construction and arrangement of parts above described, it will be seen that as the log is fed forwardly by the conveyor, it will first be severed into boards of certain thickness, and these boards will be again severed by the second saw and a third severance will take place when saw log, passes the third saw.

It will be understood that any desired number of saw units such as above described may be employed, according to the thickness of the boards desired, and it will also be seen that after a log has been sawed to produce boards of a predetermined thickness, the central portion will be left unsawed and will form a board of substantial thickness from the heart of the log.

In order that the apparatus may be readily adapted for the production of boards of different thickness, the intermediate unit (or intermediate units, if more than one be embodied in the apparatus) may be removed. This may be accomplished by first removing the rods or bolts 9 and then severing the saws of the unit or units to be removed, when the frame of such unit or units may be withdrawn from the main frame.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:

1. In saw mill apparatus, the combination with framework, of a plurality of band saw units, each unit comprising a frame, pulleys carried by said frame and a band saw passing over said pulleys to present a plurality of parallel active portions, the parallel active portions of the saw of one unit being staggered relatively to the parallel active portions of the saw of an adjacent unit.

2. In saw mill apparatus, the combination with framework, and a plurality of pulleys differing in size, supported by the upper portion of said framework, of a plurality of band saw units mounted in said framework, each of said units comprising a saw frame carrying pulleys, and a band saw passing over one of said first mentioned pulleys and passing with respect to the pulleys in said saw frame to present a plurality of parallel active portions, the parallel active portions of the saw of one unit being staggered with respect to the parallel active portions of a saw of an adjacent unit.

3. In saw mill apparatus, the combination with framework, a driving shaft supported by the same, and a plurality of pulleys differing in size carried by said shaft, of a plurality of band saw units mounted in said framework, each of said units comprising two members, pulleys mounted between said members, and a band saw passing over one of said first mentioned pulleys and passing with respect to pulleys carried by said members to present a plurality of parallel active portions, the parallel active portions of one unit being staggered with respect to the parallel active portions of a saw of an adjacent unit, one or more of said units being removable from the framework, and means for feeding a log past the saws of said units successively.

In testimony whereof, I have signed this specification in the presence of two subscribing witnesses.

LOUIS FRITZ.

Witnesses:
 GEORGE F. DOWNING,
 G. G. NOTTINGHAM.